INVENTOR
NOEL R. F. MORTIMER

BY *Murrie and Hinkey*

ATTORNEYS

United States Patent Office 3,174,805
Patented Mar. 23, 1965

3,174,805
PNEUMATIC FEEDERS
Noel R. F. Mortimer, Guildford, Surrey, England,
assignor to Vokes Limited, Surrey, England
Filed Oct. 11, 1962, Ser. No. 229,890
5 Claims. (Cl. 302—28)

This invention relates to improvements in pneumatic feed systems of the type in which a relatively light and loose substance is fed from a feeder to a number of discharge points by suction, the discharge points being in pipes branching from a manifold pipe supplied with feed material and the feeding being controlled by an electric circuit by which the demands associated with the discharge points are sampled by a sensing device, and the feed material is fed to one discharge point at a time, the control being free to feed to a second discharge point only after the needs of the first discharge point are satisfied and a delay unit has operated.

Such systems suffer from blocking caused by lumps of the material jamming in the pipes to the extent that the normal pattern of suction of the system will not free the blockages.

It can be arranged that any blocking occurs at a given point in say the main feed pipe and it is an object of the invention to provide means by which the suction pattern may be altered when a blockage occurs at such a point to a pattern more likely to free the blockage.

Accordingly the invention provides a pneumatic feeder of the type already mentioned in which the control circuit is arranged to discontinue the supply of feed material to the feeder when a blockage occurs in the system and to maintain a pulsed pattern of suction in the system until the blockage is cleared.

From another aspect the invention provides a pneumatic feeder of the type already mentioned in which the electrical control circuit is arranged to discontinue the supply of feed material to the feeder or when a blockage occurs in the system, and to maintain suction for a length of time associated with the delay unit and thereafter to set up a pattern of suction pulse by applying suction to the system to attempt to feed successive discharge points indicating a demand for a length of time determined by the delay unit, this pattern continuing until the blockage is cleared.

The control may be arranged to maintain continuous level of suction in the system at such times as blockage is present and to superimpose upon that continuous level the pattern of suction pulses.

In a system constructed so that a blockage occurs at a predetermined point in the feeder, a photoelectric or other sensing device may be located at the point, to provide a signal to cause the control to set up a pattern of suction pulses.

These and other parts of the invention are embodied in the following descriptions of two preferred forms of the invention which are given by way of example with reference to the accompanying drawings in which.

Figure 1:
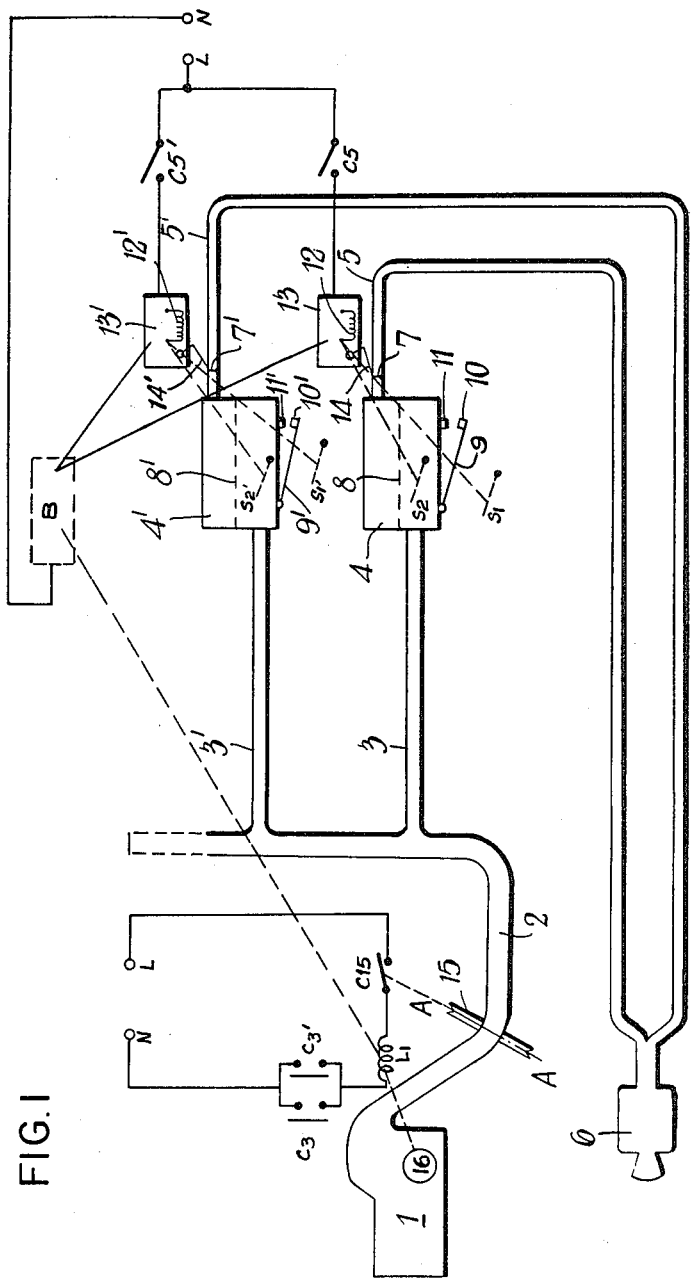
FIG. 1 is a schematic diagram of a feeder.

The feeder comprises a supply hopper 1 connected to a main feed pipe 2 from which a number of secondary pipes 3, 3' lead to dischargers 4, 4'. A pipe 5, 5' leads from each discharger 4, 4' to a suction fan 6 which operates continuously and a valve 7, 7' in each pipe 5, 5' controls the application of suction to the associated discharger 4, 4'.

The dischargers 4, 4' are of conventional form and have a screen 8, 8' separating the inlet and outlet openings. The feed material is trapped on the underside of the screen 8, 8' when suction is applied to the discharger 4, 4' and a freely hinged door 9, 9' on the underside of the discharger is held shut by suction. This door is released when suction is removed, and falls open allowing the collected feed material to fall from the discharger.

Electrical contacts 10 and 11, 10' and 11' on the door and the discharger close to form a circuit when the door is shut.

Sensing device S1, S1' operates contact T1, T1' to signify demand in the hopper of the machine fed by discharger 4, 4'.

Each valve 7, 7' is operated by a solenoid 12, 12' located in an associated discharger control box 13, 13' through a linkage system 14, 14'.

The main feed pipe 2 is so arranged that any blockage must form at a given point (indicated by the line A—A) and a photo electric device 15 at this point senses the presence of a blockage.

Sensing device S2, S2' operates contact T2, T2' to signify discharger 4, 4' is full.

Figure 2:
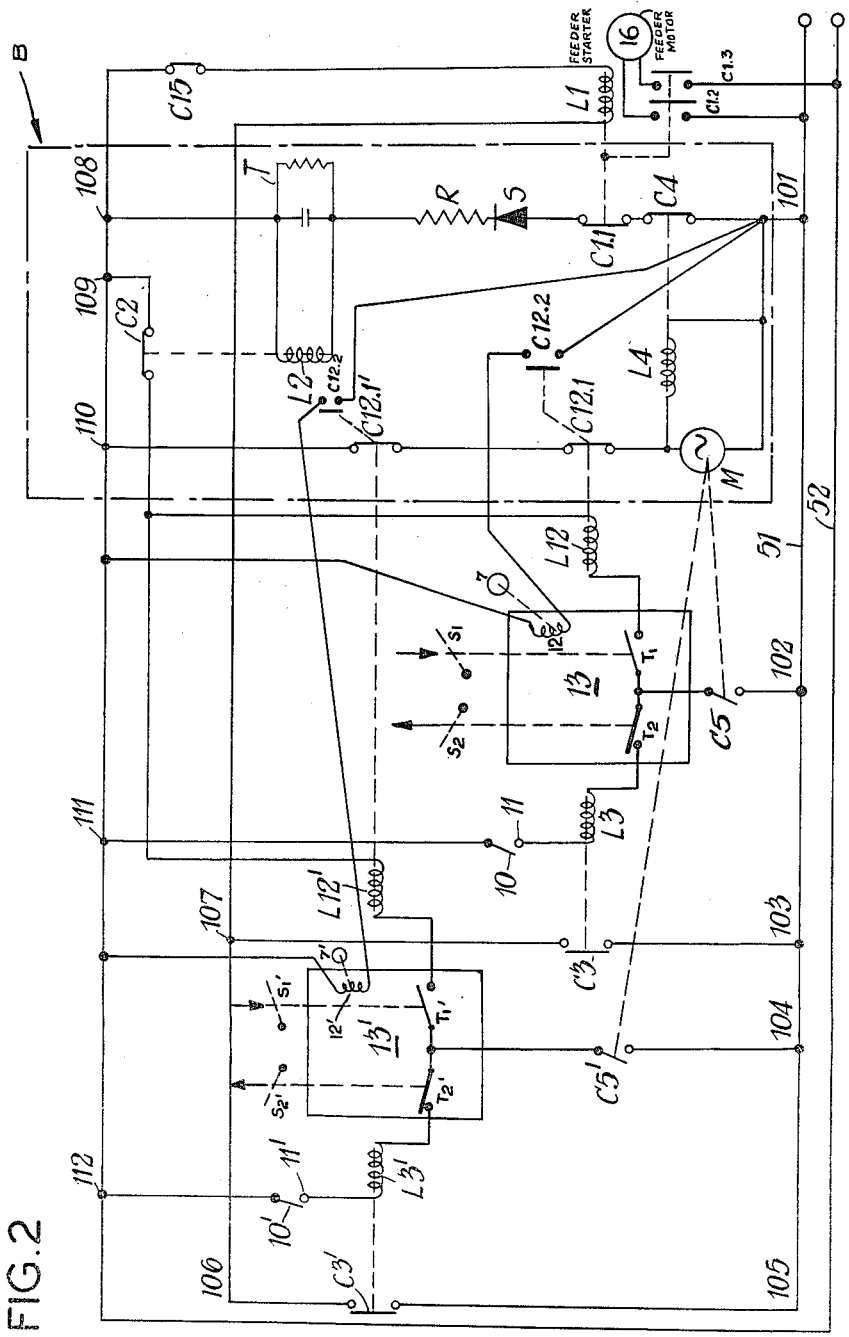
FIG. 2 is a schematic circuit diagram of one form of control circuit.
Figure 3:
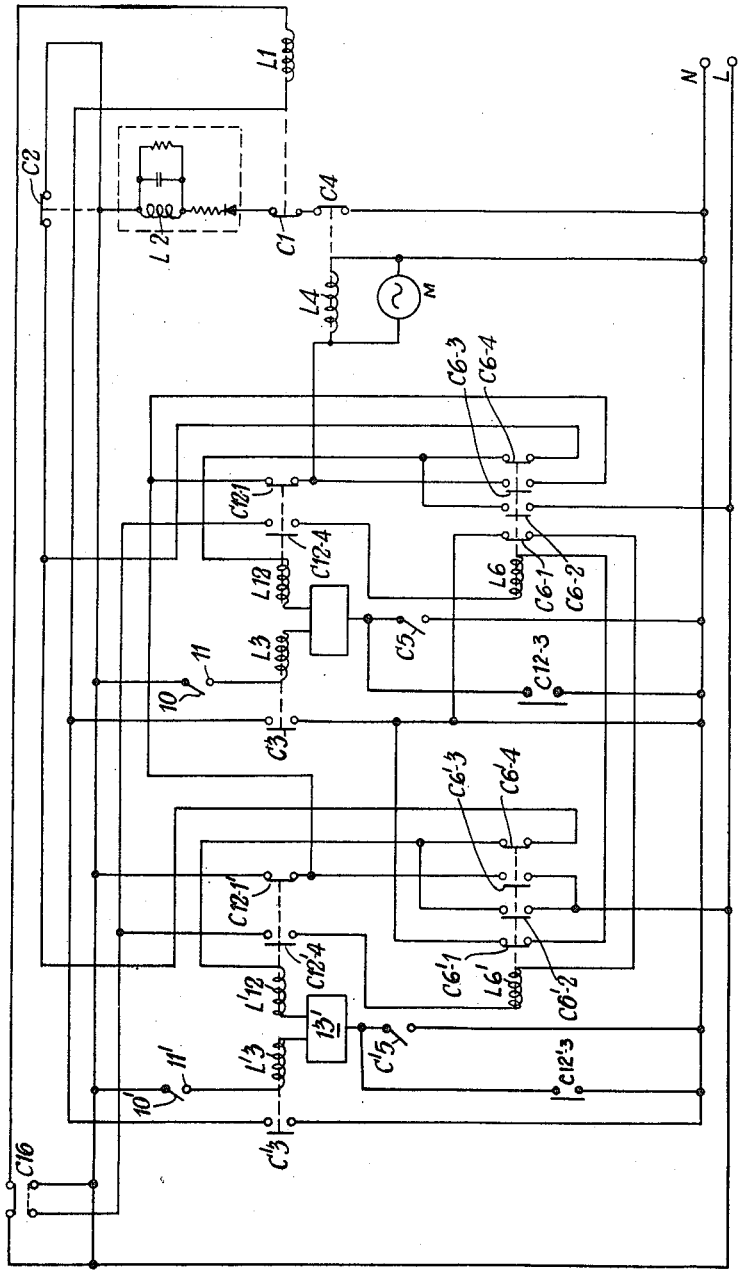
FIG. 3, is a schematic circuit diagram of another form of control circuit.

It should be noted, that although only two dischargers etc. are shown in FIG. 1 and that the control circuits of FIG. 2 and FIG. 3 correspond to the feeder as shown in FIG. 1, the system is general and can be extended to operate with any number of dischargers each located in a branch pipe and for this reason the main feed pipe 2 is shown with an open end. In fact the feeder is a closed pneumatic circuit.

The device B corresponds to the time delay unit and delay relay circuit more completely shown in FIG. 2.

The control circuit as shown in FIG. 2 is designed to produce timed suction pulses only and the control circuit of FIG. 3 is designed to produce timed suction pulses superimposed on a continuous suction level.

In each case, the discharger control boxes 13, 13' are operable only when there is a demand for feed material in the associated discharger, that is to say, when a fresh supply of material is required by a machine supplied by that discharger.

Referring now to FIG. 2, the neutral line 51 contains contact points 101, 102, 103, 104 and 105 and the live line 52 contains contact points 108 109, 110, 111 and 112 a feeder starter coil $L_1$ for a feeder 16 (FIG. 1) and the contacts $C_{15}$ of a relay operated by the photo electric device 15.

A delay relay T including a coil $L_2$, a resistance R, a rectifier S and two sets of contacts $C_{1.1}$, $C_4$ connected in series between contact points 108, and 101. Two sets of contacts $C_{12.1}$, $C_{12.1}'$ and a cam motor M are connected in series between contact points 110 and 101 and a coil $L_4$ of a relay having contacts $C_4$ is connected across the motor M.

Each control box 13, 13' is connected to a contact point 102, 104 the neutral line through a switch $C_5$, $C_5'$ operated by the cam motor M and to one end of the coils $L_{12}$, $L_{12}'$, $L_3$, $L_3'$ of each of two relays operating the contacts $C_{12.1}$, $C_{12.1'}$, $C_{12.2}$, $C_{12.2'}$ $C_3$, $C_3'$. The contacts $C_3$ and $C_3'$ are connected to contact points 103 and 105 and jointly through contact points 106 and 107 to the free end of the feeder starter coil $L_1$.

The free ends of the coils $L_3$, $L_3'$ are connected to contacts points 111, 112 in the live line 52 through the contacts 10 and 11, 10' and 11' of the door 9, 9' of the dischargers 4, 4'. The free ends of the coils $L_{12}$, $L_{12}'$ are connected to a common lead containing the contacts $C_2$ operated by the coil $L_2$ of the delay relay T and thence to contact point 109 in the live line 52.

Contacts $C_4$, $C_{1.1}$, $C_2$, $C_{15}$, $C_{12.1}$, $C_{12.1}'$ are normally closed and contacts $C_3$, $C_3'$, $C_5$, $C_5'$, $C_{12.2}$, $C_{12.2}'$, $C_{1.2}$ and $C_{1.3}$ are normally open.

In operation, the cam motor M rotates closing in turn the switches $C_5$, $C_5'$ and connecting the discharger control box 13, 13' to the neutral line 51. These boxes will form holding circuits and energize the coils $L_{12}$, $L_{12}'$ if there is a demand for feed material in the associated discharger.

The operation of either coil $L_{12}$, $L_{12}'$ will disconnect the cam motor M by opening the contacts $C_{12.1}$, $C_{12.1}'$ and open the suction valve 7, 7' by closing contacts $C_{12.2}$, $C_{12.2}'$. Since the cam motor is disconnected and stops when either coil $L_{12}$, $L_{12}'$ is energized only one box can be connected in the operating circuit at a time.

Suction being applied to the appropriate discharger 4, 4' the door of that discharger will be drawn shut closing contacts 10 and 11, 10' and 11' and energising the associated coil $L_3$, $L_3'$ closing the contacts $C_3$, $C_3'$ and energising the feeder starter coil $L_1$ if the contacts $C_{15}$ are shut i.e., if there is no blockage in the main pipe.

When the discharger is full there is no demand in the discharger and the hold on circuit made by the discharger control box 13, 13' is broken, so that there is no connection made by the associated box to the coil $L_3$, $L_3'$ causing the feeder starter coil $L_1$ to be deenergized, the supply of material to the feeder is thus stopped.

So that a reasonable delay shall occur to allow for the pipes to be cleared of feed material the coils $L_{12}$, $L_{12}'$ are maintained energised and the cam motor cannot start. However, since both coils $L_1$ and $L_4$ are deenergised both sets of contacts $C_{1.1}$, $C_4$ are closed and the delay relay T energises after a given time. Its coil $L_2$ is energised opening contacts $C_2$ and starting the cam motor by deenergising the coils $L_{12}$, $L_{12}'$. The deenergising of coils $L_{12}$, $L_{12}'$ ensures that valves 7, 7' are closed, suction is shut off and the cycle can continue.

If there is a blockage in the main pipe 2, the photo electric device 15 holds the contacts $C_{15}$ open and the feed cannot start, there being no connection to the feeder starter coil $L_1$. Therefore the delay relay T function as soon as the cam motor is stopped and the system starts up again after the given time has lapsed. Thus there is suction but no feed for the length of time associated with the delay relay.

If there is a demand at the second control box, suction will be applied but no feeding will occur either.

Suction will be continued until the delay relay has energised and the cam motor will again rotate.

At this stage, both boxes are in demand and suction will be applied in pulses, first to one box and then to the other, each pulse lasting for the same length of time.

Since each of the suction pulses acts on the blockage, it should be cleared after a small number of pulses, and, as soon as it is, the feeder can operate normally.

The complete step by step operation of the FIG. 2 device is as follows.

Demand for feed is sensed by S1, S1' and contacts T1, T1' are closed. Timer motor M is running therefore switch $C_5$, $C_5'$ will close. Coil L12, 12' will be energized to open contacts $C_{12.1}$, $C_{12.1'}$ and stop motor M. $C_5$, $C_{5'}$ will remain closed. Contacts $C_{12.2}$, $C_{12.2'}$ will close to energize solenoid 12, 12' opening valve 7, 7' via linkage 14, 14'. The door 9, 9' of the discharger 4, 4' will close making contacts 10, 11, and 10', 11'. Coil $L_3$, $L_{3'}$ will energize closing contact $C_3$, $C_{3'}$ to energize feeder starter coil L1, providing the photoelectric 15 is not blocked and $C_{15}$ is closed.

When discharger 4, 4' is full, sensing device S2, S2' will open contact T2, T2', coil L3, L3' is de-energized and contact C3, C3' is opened. Coil L1 is de-energized; contact C1.1 closes making circuit to delay timer T: at end of delay, coil L2 is energized opening contact C2; coil L12, L12' is de-energized and contact $C_{12.1}$, $C_{12.1'}$ closes; timer motor M is restarted and $C_5$, $C_{5'}$ is opened. Coil L4 is energized and contact C4 opens breaking circuit to coil L2; contact C2 closes. Contact $C_{12.2}$, $C_{12.2'}$ opens releasing solenoid valve 7, 7' allowing discharger door 9, 9' to fall open; demand in machine is thus satisfied.

If blockage appears in pipe 2 while a discharger is being fed, the photoelectric device 15 will operate and open contact $C_{15}$ to de-energize coil L1; contact C1.1 closes to start timer T. When L2 operates suction will be removed and timer M will restart as described above. If a second demand exists on any channel, suction will be applied as above, but feeder starter coil L1 will not be energized, therefore timer T will commence to time and coil L2 will eventually be energized to discontinue suction. Demands will now exist on all channels and pulses of suction will be applied to the blockage by the valves 7, 7' being operated in sequence for the time set on timer T. Immediately the blockages are removed, contact $C_{15}$ will close to energize coil L1 and the normal operation will continue, as previously described.

The control circuit of FIG. 3 is designed to produce the same pattern of pulses each lasting for the length of time that it takes the delay relay to energise but it is also arranged to hold one suction valve open so that the pulses are superimposed on a continuous suction. With this arrangement the suction fan 6 should be capable of supplying a multiple of the basic suction required.

In many respects the circuit is similar to that of FIG. 2 and will not be described in detail, the corresponding units of the two circuits being denoted by the same references.

The single set of contacts $C_{15}$ of FIG. 2 are replaced by a double set of contacts $C_{16}$ the upper pair serving the same functions as those of FIG. 2 while the lower pair, which are contacted when the photo electric device 15 detects a blockage connect into the circuit the additional relay coils $L_6$, $L_6'$.

These relays have four sets of contacts $C_{6-1}$, $C_{6-2}$, $C_{6-3}$, $C_{6-4}$, and $C_{6'-1}$, $C_{6'-2}$, $C_{6'-3}$, $C_{6'-4}$ contact $C_{6-1}$ being normally closed and in series with $L_{6'}$ and $C_{6'-1}$ being normally closed and in series with $L_6$ so that the operation of one relay will disconnect the other from the circuit.

Solenoids $L_{12}$, $L_{12}'$ are each provided with an additional contact $C_{12-4}$, $C_{12'-4}$ which is normally open. When a feed is attempted to a particular machine the coil $L_{12}$ or $L_{12'}$ will energise and close the appropriate contact $C_{12-4}$, $C_{12'-4}$ completing that part of the circuit to the coil $L_6$ or $L_{6'}$. On blockage occurring, the movement of contacts $C_{16}$ together with the appropriate contacts $C_{12-4}$, $C_{12'-4}$ will complete the circuit to cause the appropriate relay $L_6$ or $L_{6'}$ to energise.

Contacts $C_{6-2}$, $C_{6-4}$ and $C_{6'-2}$, $C_{6'-4}$ are arranged so that in the event of blockage causing energising of either $L_6$ or $L_{6'}$, the appropriate solenoid $L_{12}$ or $L_{12'}$ is disconnected from the holding circuit through contacts $C_2$ and is reconnected directly to the live circuit.

Contacts $C_{6-3}$, $C_{6'-3}$ serve to short-circuit the contacts $C_{12-1}$, or $C_{12'-1}$.

Extra contact $C_{12.3}$, $C_{12.3'}$ on L12, L12' is added to make a hold on circuit for L12, L12' when timer motor M restarts during a blockage, otherwise when C5, C5' open, suction is removed as L12, L12' are deenergized.

In normal operation, this circuit is no different from that of FIG. 2, but if a blockage occurs this circuit will isolate the discharger which it was trying to feed when the blockage occurred, maintaining its coil energised and the corresponding suction valve open.

However the remainder of the circuit continues to operate in the same way as the circuit of FIG. 2 so that a pattern of short suction pulses is superimposed on a continuous suction.

This arrangement is used to prevent feed material falling back onto the blockage and augmenting the damage.

It is as well to re-emphasize that this circuit is a general one and can be generalized to control a feeder having any number of dischargers.

I claim:

1. An automatic feed apparatus for light and loose substances such as tobacco, comprising a bulk supply hopper connected by a pipe system to a number of dischargers for machines utilizing such substance, means for feeding substance from said hopper to said pipe system, and an electric control circuit, said control circuit including a demand sensing device associated with each discharger for signaling origination and satisfaction of demand therefrom, means for applying suction in said pipe system to one discharger during the demand period signaled by the sensing device associated therewith, means sensitive to a blockage in said pipe system, and means operative to maintain a pulsed pattern of suction in the pipe system until such blockage is cleared.

2. An automatic feed apparatus according to claim 1 in which said electric control circuit includes means to discontinue the automatic feed from said supply hopper to said one discharger without breaking suction before the inception of the said pulsed pattern.

3. An automatic feed apparatus according to claim 1 wherein said means operative to maintain a pulsed pattern of suction includes a time delay unit operative to maintain suction to said one discharger for a predetermined period of time and thereafter to control the timing of the suction pulses.

4. An automatic feed apparatus according to claim 1 in which said electric control circuit includes means to maintain a steady suction upon which the said pulsed pattern is superimposed.

5. An automatic feed apparatus according to claim 1 wherein said means sensitive to a blockage includes a photoelectric device located at a possible blockage point and operative to cause the electric control circuit to set up the said pulsed pattern.

References Cited by the Examiner
UNITED STATES PATENTS

| | | | |
|---|---|---|---|
| 1,074,016 | 9/13 | Remenschneider | 302—26 |
| 2,195,407 | 4/40 | Craggs | 302—26 |
| 2,972,500 | 2/61 | Esenwein | 302—28 |
| 3,099,492 | 7/63 | Mortimer | 302—28 |

SAMUEL F. COLEMAN, *Primary Examiner.*

ANDRES H. NIELSEN, *Examiner.*